M. ARENDT.
CONSTRUCTION OF ELECTRICALLY DRIVEN CLOTH CUTTING MACHINES.
APPLICATION FILED JUNE 7, 1916.
1,221,409.
Patented Apr. 3, 1917.
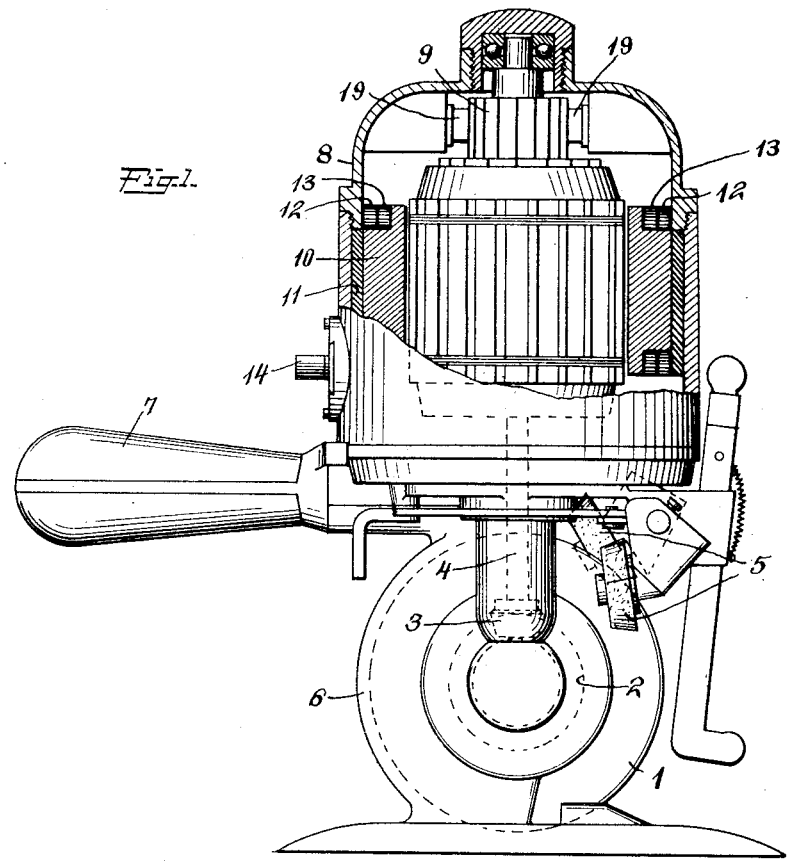
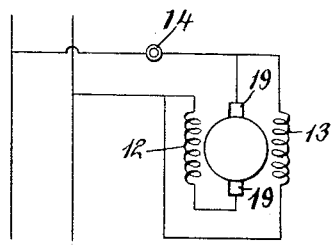
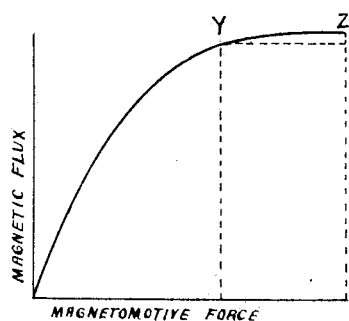

UNITED STATES PATENT OFFICE.

MORTON ARENDT, OF NEW YORK, N. Y., ASSIGNOR TO H. MAIMIN COMPANY, INC., OF NEW YORK, N. Y., A CORPORATION OF NEW YORK.

CONSTRUCTION OF ELECTRICALLY-DRIVEN CLOTH-CUTTING MACHINES.

1,221,409.      Specification of Letters Patent.      Patented Apr. 3, 1917.

Application filed June 7, 1916. Serial No. 102,203.

*To all whom it may concern:*

Be it known that I, MORTON ARENDT, a citizen of the United States, and a resident of New York city, borough of Manhattan, county and State of New York, have invented certain new and useful Improvements in the Construction of Electrically-Driven Cloth-Cutting Machines; and I do hereby declare the following to be a full, clear, and exact description of the invention, such as will enable others skilled in the art to which it appertains to make and use the same.

The present invention relates to electric motors and more particularly to a motor especially adapted for cloth cutting machines and similar apparatus.

Cloth cutting machines and the like are portable, and it is therefore preferable to provide therefor an electric driving motor for which starting resistance is unnecessary. In some prior types of cloth cutting machines the starting resistance has been omitted, but objectionable features in operation have been encountered in that the excessive starting current produces a high initial acceleration with the result that the machine may be twisted and the lays of cloth cut in an undesired direction. Attempts have been made to obviate this difficulty in starting by providing a series field winding proportioned to prevent an excessive inrush of current, but the further difficulty then arises in the speed regulation of the motor under normal operation, because then the series field winding causes a material decrease of speed when the number of lays of cloth, or the load of other kind, increases. It has also been proposed to provide the series field winding to remedy the difficulty in starting, and then obviate the difficulty under normal operation by short circuiting or otherwise cutting out the series field winding as soon as the motor has acquired speed. However, this expediency imposes an additional duty on the operator, and if the switch for the purpose is not correctly positioned, either the difficulty in starting is experienced, or the undesirable speed regulation occurs.

In accordance with my invention, both the excessive inrush of current at starting and the variation of speed under normal operation are prevented by the inherent characteristics of the motor; that is, I provide a motor which, in effect, has the characteristic of a series motor in starting, and the characteristic of a shunt motor in operation, so that the operator is not required to alter the connections of the motor at any time. I do this by providing an electric motor of the commutator type with permanently connected series and shunt windings, proportioned in a novel manner. The series winding has sufficient self-induction to prevent an excessive inrush of current in starting, while the shunt winding provides sufficient magnetomotive force at normal excitation to maintain by itself a substantially magnetically saturated condition of the motor. In this way, the series field winding is effective to prevent the excessive acceleration in starting, but owing to the condition of the magnetic circuit brought about by the shunt winding, the series winding is not effective to materially change the speed of the motor even under wide variations of load.

The high degree of magnetization due to the shunt field winding may be provided in several ways as by a high value of the ampere turns thereof, which, under usual conditions, requires a comparatively low value of armature turns, and therefore improves the commutation; or it may be provided by slotting one or more of the field poles transversely of the magnetic flux therethrough.

In the accompanying drawings illustrating my invention in application to a rotary cloth cutting machine, as an example, Figure 1 is a side elevation, showing the cutting knife in full view and the electric driving motor therefor in central section;

Fig. 2 is a diagram of the electrical connections; and

Fig. 3 is a magnetization curve of the motor.

The rotary cutting knife 1 is fastened to a bevel gear 2, which is meshed with a smaller bevel gear 3 on the end of the armature shaft 4. These devices, together with the knife sharpening grinders 5 and the operating mechanism therefor, the knife guard 6 and the directing handle 7, are well known in the prior art. The motor shown herein is of the direct current commutator type, having the armature 8. the commutator 9, brushes 19 the two field poles 10 and the circular field yoke 11. Each field pole carries a series field coil 12 and a shunt field coil 13, the series turns 12 being permanently connected in series with the armature winding, while the shunt turns 13 are permanently connected in shunt across the outer terminals of the motor, as shown in Fig. 2.

The shunt turns 13 are so proportioned that the magnetomotive force thereof at normal excitation magnetizes the magnetic circuit of the motor to the neighborhood of its saturation point, that is, well beyond the knee of the magnetization curve, as indicated at Y in Fig. 3. Thus, the magnetomotive force of the series turns 12, indicated between Y and Z in Fig. 3, varies the total magnetic flux comparatively little, although the load may vary between wide limits. In consequence of this condition, the variation of speed of the motor occurring as a result of the load curent flowing through the series field coils and the armature winding will not produce an undesirable variation of speed under wide changes of load.

Furthermore, the series turns 12 are so proportioned that an excessive inrush of current at starting is prevented by the self-induction thereof. Thus, after closing the switch 14 to start the motor, the initial flow of current is choked back to such an extent that the initial acceleration is not unduly high, and the acceleration of the motor to its normal speed is not sufficiently high or sufficiently abrupt at any point to cause a twist or jump of the machine, or to precipitate an uncontrollable cut in the cloth in an undesirable direction.

In the motor herein shown, the field poles 10 are not slotted. However, the armature is preferably weak in comparison with the shunt field, that is the armature ampere turns at normal load are of a low value compared with the ampere turns of the shunt field winding at normal excitation. This improves the commutation of the motor, because the effect of armature reaction on the field is less pronounced.

Thus, it will be seen that in accordance with this invention, I provide an electric motor of the commutator type for driving cloth cutting machines and performing analogous duties, wherein the absence of starting resistance does not cause undesirable features of operation in starting, and wherein the use of a permanently connected series field winding does not introduce objectionable features in the speed regulation of the motor under wide variations of load.

Having thus described my invention, what I claim is:

1. In a portable electric motor of the commutator type for driving cloth cutting machines and the like, an armature, and a permanently connected field winding producing a series motor characteristic in starting and a shunt motor characteristic in normal operation, said field winding comprising series turns having sufficient self-induction to allow only an inexcessive inrush of current to the armature in starting and also comprising shunt turns providing sufficient magnetomotive force at normal excitation to maintain by itself a substantially magnetically saturated condition of the motor.

2. In a portable electric motor of the commutator type for driving cloth cutting machines and the like, an armature, and a permanently connected field winding producing a series motor characteristic in starting and a shunt motor characteristic in normal operation, said field winding comprising series turns having sufficient self-induction to allow only an inexcessive inrush of current to the armature in starting and also comprising shunt turns providing sufficient magnetomotive force at normal excitation to maintain by itself a substantially magnetically saturated condition of the motor, the armature ampere turns at normal load being of low value compared with the shunt field ampere turns at normal excitation.

In testimony whereof I affix my signature.

MORTON ARENDT.

Copies of this patent may be obtained for five cents each, by addressing the "Commissioner of Patents, Washington, D. C."